INVENTOR.
ALBERT P. SCHNAIBLE
BY K. L. Doub
ATTORNEY

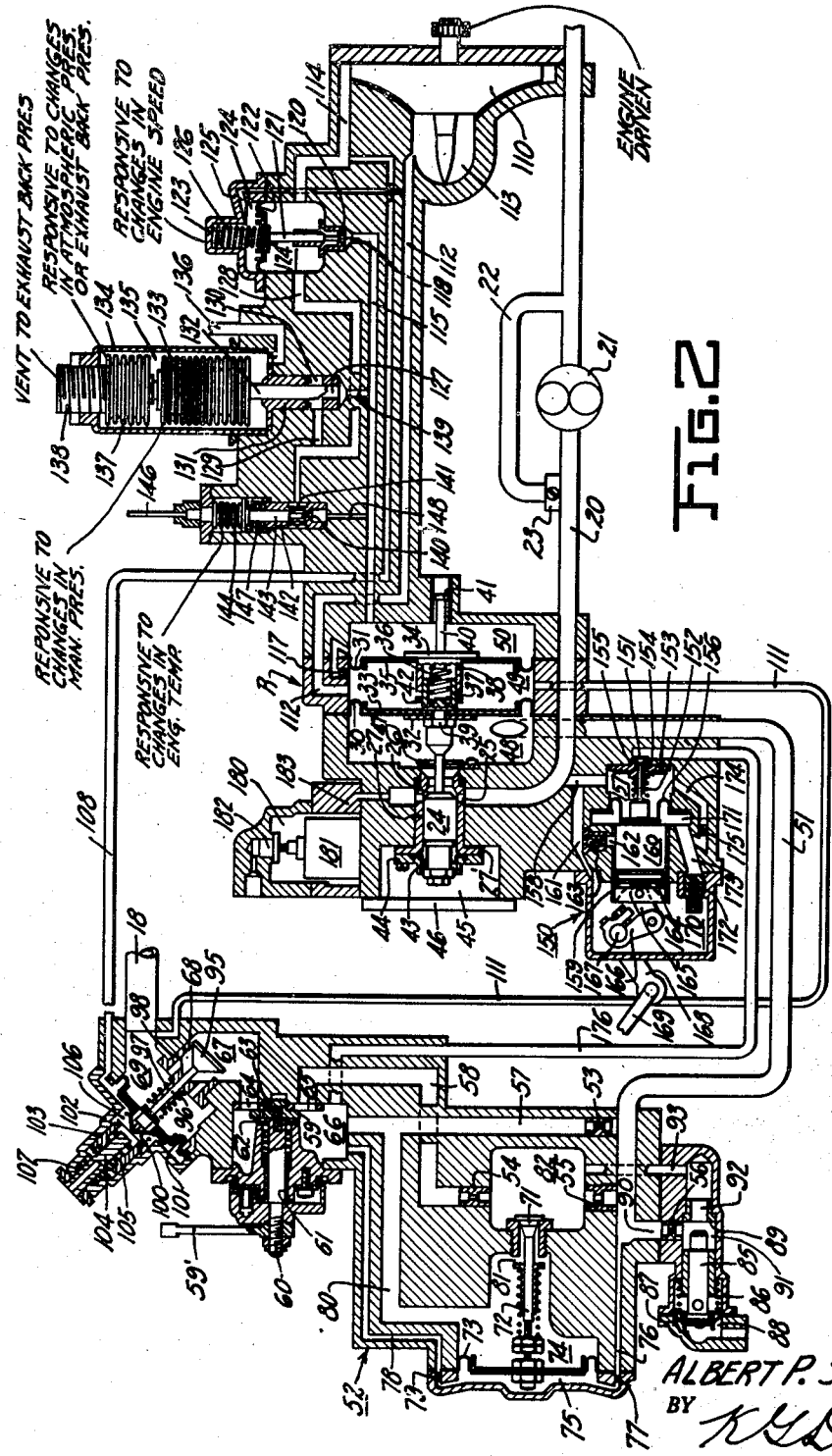

Patented Apr. 4, 1950

2,502,997

UNITED STATES PATENT OFFICE 2,502,997

FUEL METERING DEVICE

Albert P. Schnaible, South Bend, Ind., assignor to Bendix Aviation Corporation, South Bend, Ind., a corporation of Delaware Application December 11, 1947, Serial No. 791,008

16 Claims. (Cl. 123—119)

Fuel metering or charge forming devices which meter fuel as a function of engine speed modified by some variable or variables indicative of mass air flow are known, see for example U. S. Patent No. 2,426,153 granted to Frank C. Mock August 19, 1947; also copending application Serial No. 586,223 filed April 2, 1945 by the said Frank C. Mock. In such devices, metering is based on the assumption that the weight of air used by an engine is, within reasonably close limits, proportional to engine speed. This assumes substantially constant volumetric efficiency, which is not attained in certain types of engines, as for example, in air cooled engines having relatively high valve overlap. Accordingly, when selecting a fuel supply system for the latter types of engines, preference has heretofore usually been given to those systems wherein the flow of air is measured by a venturi or the like located in the air intake conduit and converted to an air metering force which is balanced against a force indicative of the rate of fuel flow, to maintain the desired metering head across fixed metering jets, as in the so-called injection carburetor. Such a carburetor also has the advantage of fixed jets which can easily be changed when a change in setting is desired; and it involves less complications to provide enrichment in the power range proportional to air flow, a requirement in most air cooled engines. On the other hand, when air flows through the Venturi approach sonic velocity, the Venturi depression departs from its predetermined velocity relationship and produces an error in the metering head. Where the metering head across a metering orifice is to be maintained primarily as a function of engine speed, no such complications as to air measurement are involved; however, fuel flow is not as directly responsive to changes in mass air flow, and to modify the rate of fuel flow as a function of manifold pressure or some other variable indicative of the absolute pressure applied to the engine cylinders requires variation in the area of the metering orifice, so that the advantages of fixed jets are not present.

Thus it will be seen that for certain types of engines, efficient fuel metering demands a compromise between the two systems. This is accomplished in the present invention by a novel arrangement of hydraulic circuits and coordinated integration of certain engine variables, viz. engine speed, manifold absolute pressure and temperature, and exhaust back pressure whereby the metering head across one or more fixed jets is rendered directly proportional to mass air flow squared, and since the quantity of fuel flowing through an orifice is proportional to area times the square root of the head, fuel flow becomes proportional to air flow.

The present invention has for an object, therefore, to provide an improved fuel metering or charge forming device, particularly adapted for engines having certain characteristics which will meter fuel proportional to mass flow of air to the engine.

Another object of the invention is to provide a fuel metering device embodying hydraulic circuits and coordinated flow controlling devices responsive to certain engine variables, including engine speed, integrated to produce a metering head across a metering jet proportional to mass air flow.

Another object is to provide a fuel metering device which is basically of the speed responsive type, having means for correcting the metering head for a departure of the engine from a given volumetric efficiency versus engine speed curve.

Another object is to provide a fuel metering device which is primarily of the speed responsive type having an improved idle system.

Another object is to provide in such a device means for suppressing detonation at high power output.

A still further object is to generally improve fuel metering devices which function primarily on the basis of engine speed modified by one or more variables indicative of mass flow of air to the engine.

The foregoing and other objects and advantages will become apparent in view of the following description taken in conjunction with the drawings, wherein:

Figure 2 is a sectional schematic of the fuel metering device; and

Figure 1:
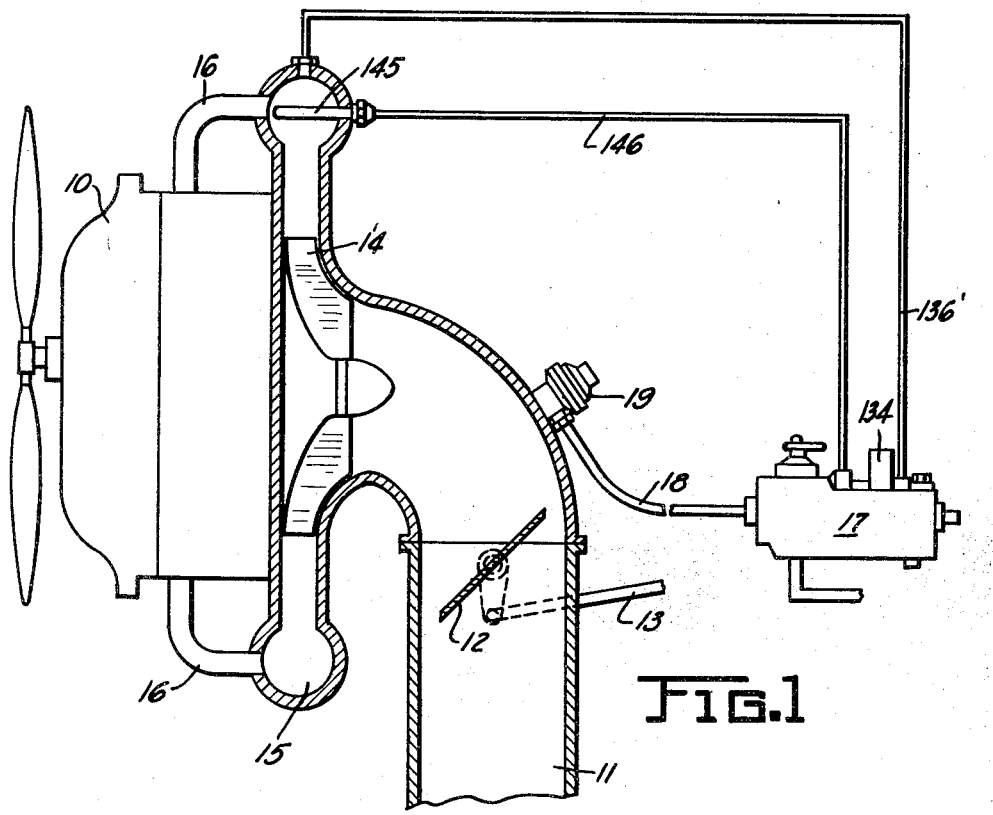
Figure 1 is a diagram of a radial air cooled engine having a fuel metering device in accordance with the present invention operatively associated therewith.

Referring to the drawings, and first to Figure 1, the engine is generally indicated at 10; it has an air intake conduit 11 provided with a throttle valve 12 controllable from a pilot's compartment or the like through the medium of linkage 13. A supercharger 14 pressurizes the air flowing to the engine by way of intake manifold 15 and cylinder pipes 16. The fuel metering device with which the present invention is concerned is generally indicated at 17; it supplies fuel to the engine by way of a conduit 18 and pressure type discharge nozzle 19, the latter preferably being located to discharge fuel into the air intake 11 posterior the throttle 12.

Referring now to Figure 2, fuel is flowed to the regulator section R of the metering device 17 by way of a conduit 20 from a source of supply, not shown, the fuel being maintained at a substantially constant pressure by suitable means such as a positive displacement pump 21 having a by-pass 22 controlled by a valve 23 adapted to open when subjected to a predetermined pressure.

A fuel flow regulating valve, shown as of the balanced poppet type, is indicated at 24; it controls ports 25 and 26 defined by a bushing 27 having a flange 27' secured to the adjacent wall of the device 17. The valve 24 is carried by a pair of diaphragms 30 and 31 which are centrally clamped between reinforcing and guide plates 32, 33, 34 and 35. The connection between the valve 24 and diaphragms 30 and 31 is preferably such that at low engine speeds and consequently at low differential pressures, the said valve will be held open to permit a certain amount of idling fuel to flow through the unit. One method of accomplishing this result is to mount a spring 36 within a pair of telescoped bushings 37 and 38 forming part of, or suitably connected to, the adjacent diaphragm plates 33 and 35, the stem of the valve 24 having its inner end enlarged to engage the bushing 37 and being locked in place by a nut 39. The bushing 38 also has a stem 40 which projects into a guide bushing 41. When the differential across the diaphragms 30 and 31 drops to a predetermined low value, the spring 36 tends to separate the diaphragms, but since the end of the stem 40 will abut the adjacent end of the guide bushing 41 after the diaphragm 31 has moved a certain distance to the right in Figure 2, the force of the spring will be applied to the left, holding the valve 24 open. Since the controlling differential across the diaphragm 31 tends to move the latter to the left against the pressure of the fuel flowing past the poppet valve 24 to the engine, it is essential that the two diaphragms move in unison at engine speeds above idling; hence an adjustable stop such as that indicated at 42 is provided for engagement by the bushing 38 when the spring 36 has been compressed a predetermined amount. For a more complete showing and description of this part of the idling system, reference may be had to the copending application of Frank C. Mock, Serial No. 538,153, filed May 31, 1944, and now Patent No. 2,500,088, granted March 7, 1950.

The outer end of the valve 24 is provided with a balancing and sealing diaphragm 43 having its peripheral edge engaged in a cap 44 secured to the flange 27' of the bushing 27. This end assembly is located in a chamber 45 provided with a cover 46. The part indicated at 47 is a baffle member to minimize turbulence of the fuel flowing into chamber 48.

The diaphragms 30 and 31 in conjunction with the adjacent walls of the device define three chambers 48, 49 and 50. Fuel passed by the poppet valve 24 flows into chamber 48 and thence by way of passage or conduit 51 to a fuel control section, generally indicated at 52, in which the metering jets are located. The latter in the example shown comprise four in number and are identified as auto-lean jet 53, auto-rich jet 54, power enrichment jet 55 and derichment jet 56.

The jets 53 and 54 are located in flow channels 57 and 58 controlled by a manual mixture selector valve 59 operatively connected to a valve handle or lever 59' by means of a shaft 60, rotatably mounted in a sealed bearing or bushing 61 and formed with a disc-shaped inner end which is pinned or otherwise suitably secured to the said valve, as at 62. The valve 59 coacts with a relatively stationary disc-shaped member 63 formed with ports 64 and 65.

Figure 3:
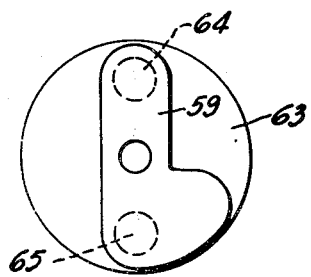
Figures 3, 4 and 5 are views in elevation of a manual control valve, illustrating the different flow selecting positions of the valve.
Figure 5:
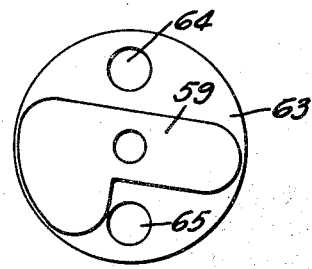
Figure 4:
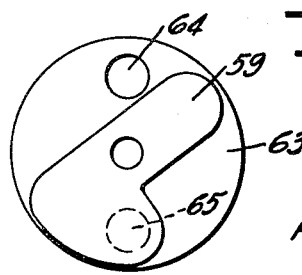

The different positions of the valve 59 are shown in Figures 3, 4 and 5. When in the idle cut-off position of Figure 3, both the ports 64 and 65 are closed, and no fuel can flow to the engine through the valve disc 63, or through either ports 64 and 65. When the valve 59 is rotated to the auto-lean position of Figure 4, the port 64 is opened while the port 65 is closed. When in this position, fuel may flow through the auto-lean jet 53, passage 57 into chamber 66 and thence by way of port 64 and the chamber or passage 67, through idle valve port 68, into chamber 69 and thence by way of fuel conduit 18 to the nozzle 19. When the valve member 59 is rotated to the auto-rich position of Figure 5, fuel may flow not only through the jet 53 and passage 57 to the chamber 66, but also through the jet 55, chamber 82, jet 54 and passage 58 to said chamber 66, and thence, as above noted, through the port 64 into chamber 67 through the idle valve port 68 to the fuel conduit 18.

A power enrichment valve is indicated at 71; it is provided with a valve stem 72 which is connected to a diaphragm 73, the latter in conjunction with the adjacent walls of the unit 52 defining an inner chamber 74 and an outer chamber 75. The fuel from the conduit 51 may be communicated to the chamber 75 by way of a passage 76 having a restriction 77 therein, and fuel may flow from the chamber 75 through a passage 78 having a smaller restriction 79 therein. When valve 71 is open, fuel may flow from the chamber 82 through port 81, to the chamber 74 and thence by way of a passage 80 to chamber 66; and assuming the manual control valve 59 to be in the position of Figure 5, the flow will be increased by the amount metered across the port or orifice 81. It will be seen that when the differential pressure across diaphragm 73 attains a predetermined value, the valve 71 will open and begin to meter enrichment fuel to the engine. Since the pressure in conduits 51 and 76 is proportional to the rate of fuel flow, the opening of valve 71 becomes a function of the fuel head across the metering jets, which in turn is a function of the rate of air flow.

It may be desirable to utilize an antidetonant fluid while operating in the high power range, in which event it is customary to derich the normal fuel-air mixture to obtain a "best-power" mixture. A derichment valve is indicated at 85; it is normally urged toward open position by means of a spring 86. A diaphragm 87 is connected to the derichment valve, and when the pressure in chamber 88 in back of this diaphragm attains a predetermined value, the said valve closes and engages a seat 89. When the valve is open, fuel may flow from conduit 51 by way of passage 60 and jet 56 into valve chamber 91, and thence through port 92 and passage 93 to the chamber 82 and on to the engine in the manner heretofore described. However, when the derichment valve 85 closes, the fuel-air mixture is deriched or reduced by the amount of this flow. The derichment valve may be controlled in the manner illustrated and described in the copending application of Jay A. Bolt and Robert W. Moore, Serial No. 749,716, filed May 22, 1947 now Patent Number 2,447,793 granted August 24, 1948.

An idle metering valve is indicated at 95. It is provided with a stem 96 encircled by a spring 97 which at one end engages a ported valve body 98 defining the port 68. At its opposite end the spring 97 abuts a flanged nut and urges the free end of the valve stem against the central dished portion of a diaphragm plate 100, which is connected to a diaphragm 101. A cap or cover 102 is connected to the housing or casting 52 in rear of the diaphragm and defines a pressure chamber 103. Within this cap or cover is mounted an adjusting screw 104, which is in screw threaded engagement with a slidable bushing 105, the latter in turn engaging the one end of a spring 106 encircling the central cup-shaped portion of the diaphragm plate 100. A spring-pressed seal 107 prevents escape of fuel from the chamber 103. The diaphragm chamber 103 is vented to the discharge or high pressure side of a centrifugal pump 110 by a conduit 108. As will be more fully hereinafter described, the idle valve 95 coacts with the idle spring 36 to meter idling fuel to the engine when the differential across diaphragms 31 and 30 drops to a predetermined low value.

Reverting now to the metering head regulator section R, a centrifugal pump is indicated at 110; it is adapted to be driven in relation to engine speed and its purpose is to set up a hydraulic control pressure as a function of engine speed which is corrected or modified in a manner hereinafter described to produce a head across a jet 117, and hence across the diaphragm 31, proportional to air flow squared. The central diaphragm chamber 49 is vented to the metered fuel outlet chamber 69 by a conduit 111, and the pump 110 establishes a forced circulation of fuel from this chamber by way of passage 112 to the pump intake chamber 113, thence back through passages 114 and 115 to the chamber 50 and through a passage 116 having control jet 117 therein to chamber 49. The jet 117 is preferably of a capacity such as to apply only a small load on the pump, so that the head across the jet is substantially proportional to engine speed squared.

Between the pump output and the control jet, or more specifically, between the passages 114 and 115 are a plurality of variable area orifices in parallel, controlled as a function of manifold absolute pressure modified by exhaust back pressure, temperature, and engine speed. The first of these orifices from right to left in Figure 2 is indicated at 118; it is defined by a seat 119 carried by a ported valve body 120 having a guide portion projecting upwardly therefrom in which a needle valve 121 is slidingly mounted and has its upper end connected to a diaphragm 122. A cap or cover 123 is secured to the adjacent part of the main housing and together with the diaphragm defines a chamber 124 which is vented to the low pressure side of pump 110 by means of a duct 125. A substantially constant rate spring 126 is seated in the cap 123 and applies a substantially constant pressure on the diaphragm in a valve closing direction. Since the differential pressure between chambers 124 and 124' is proportional to engine speed, the needle valve 121 may be contoured to produce a drop across the orifice 118 as a function of engine speed. The purpose of this control is to modify the control pressure generated by the pump 110 in a manner such as to correct the fuel-air ratio for departure by the engine from a plotted volumetric efficiency versus engine speed curve, which in engines having certain characteristics occurs at certain loads, or at certain speeds and manifold pressures.

The second of the group of orifices in parallel is for modification of the control pressure as a function of manifold absolute pressure corrected for changes in exhaust back pressure; it is indicated at 127 and receives fuel from the passage 114 by way of the chamber 127, passages 128 and 129 and ports 130 formed in a valve body 131. A needle valve 132 has a contoured portion coacting with the orifice 127; it is carried by the movable end of a spring loaded evacuated bellows or capsule 133 located in a housing 134 defining a chamber 135 which is in pressure communication with the intake manifold by means of passage and tube or conduit 136. The upper end of the bellows 133 is connected to another smaller spring loaded bellows 137 having the interior thereof vented to atmospheric pressure through a hollow threaded fitting 138, by means of which the compound bellows assembly is anchored to the housing 134. Since atmospheric pressure is an index of exhaust back pressure, assuming the exhaust system is not subjected to a variable factor such as an exhaust driven turbine, the effective travel of the movable end of the bellows 133 will be proportional to changes in manifold pressure as corrected for changes in exhaust back pressure. A passage 139 communicates orifice 127 with the passage 115. For a more complete description and showing of a bellows assembly suitable for this duty, reference may be had to the copending application of Frank C. Mock, Serial No. 586,223, filed April 2, 1945.

The third of the group of orifices in parallel is for correction of the control pressure as a function of manifold temperature; it is indicated at 140 and receives fuel from the passage 114 by way of chamber 127, passage 128 and inlet ports 141 formed in a valve body 142. A needle valve 143 has a contoured portion coacting with said orifice 140; it is carried by the movable end of a bellows 144 having the interior thereof in communication with a thermal element 145, note Figure 1, by suitable tubing 146, the bellows being maintained in a predetermined collapsed condition by means of a calibrated spring 147. The thermal element 145, tube or pipe 146 and bellows 144 may be filled with a suitable temperature responsive fluid, so that when the temperature rises in the manifold 15, the fluid will expand and in turn cause the movable end of the bellows to expand or move downwardly against the tension of the spring 147. A passage 148 communicates port 140 with the passage 115.

The manner in which the respective engine variables, viz. engine speed, manifold absolute pressure and temperature and exhaust back pressure are utilized to produce a hydraulic head across the control jet 117 proportional to air flow squared will be more fully set forth in the description of operation.

An accelerator pump is generally indicated at 150; it comprises a valve 151 which is biased toward closed position by means of a spring 152, the stem of the valve being slidable in a valve body 153 formed with inlet ports 154 and a discharge opening or port 155 controlled by the valve 151. The stem of the valve is mounted to slide in a projecting portion of the valve body and is operatively connected to a diaphragm 156 on one side of which is a chamber 157, communicating with the fuel input conduit 20 by way of passage 158. A hollow cylinder 159 is located on the opposite side of the diaphragm 156 and defines a piston chamber 160 which has one-way flow communication with fuel conduit 20 by way of passage 161 and 162, the latter being controlled by a fill check valve 163. A piston 164 is mounted to reciprocate in the cylinder 159 and is operatively connected to the throttle control mechanism by means of links 165 and 166, shaft 167, arm 168 and rod 169. A chamber 170 in rear of the piston 164 is vented by the passage 161 to the fuel conduit 20. Between the diaphragm 156 and cylinder 159 is a chamber 171 in which a valve opening pressure is established when the piston 164 is depressed through opening movement of the throttle. A high pressure release valve 172, located in a passage 173, prevents the pressure in chamber 171 from rising beyond a predetermined safe value, and chamber 157 is vented to passage 173 by way of a passage 174 having a restriction 175 therein.

When the throttle is closed, the accelerator piston 164 is retracted (the position shown in Figure 2), having made a suction stroke during which fuel was drawn into the piston chambers 160 and 171. Should the throttle be opened beyond a predetermined idle position, the piston 164 will be depressed, generating pressure above the diaphragm 156, causing the accelerator valve 151 to open and discharge pick-up fuel into a channel or passage 176, from which it flows by way of chamber 66, port 64 and chambers 67 and 69 to the fuel discharge conduit 18 and thence to the nozzle 19.

The general arrangement of the accelerator pump 150 is shown and described in a copending application of Jerome A. Church, Serial No. 755,808, filed October 5, 1946.

A float chamber is indicated at 180; it has mounted therein a float 181 which controls a vent valve 182. A passage 183 communicates the float chamber with the input side of the regulator R. When vapor pressure in chamber 180 exceeds a predetermined value, float 181 lowers, and vapor escapes through valve 182.

*Operation*

Assuming the various fuel chambers and flow channels to be filled with fuel, the engine driven centrifugal pump or impeller 110 establishes a circulation of fuel from the central chamber 49, passage 112, chamber 113 to the high pressure side of the pump chamber, thence by way of passages 114 and 115 to chamber 50 and across the diaphragm 31 through passage 116 and restriction 117 back to chamber 49. To simplify the description, let it be assumed that manifold pressure, exhaust back pressure and volumetric efficiency are held constant, then the drop across the control restriction 117 and hence the differential across the diaphragm 31 would be proportional to the square of engine speed. In any fuel metering device, it is necessary to proportion the fuel flow in accordance with air flow to give the desired fuel-air ratio under all conditions of operation. In a metering device wherein the metering head across a variable jet is proportional to engine speed and the area of the jet is varied as a function of certain engine variables indicative of mass air flow, the usual formula is $$A = KN\left(\frac{MP - BP/k}{T^x}\right)$$

where A represents air flow, N engine speed, T manifold temperature °F. absolute, MP manifold pressure Hg, BP exhaust back pressure, K a constant, and $k$ a variable depending upon engine characteristics.

The above formula assumes that constant volumetric efficiency is maintained under all operating conditions, which, as heretofore indicated, is not true in certain types of engines, as in present day air cooled engines which employ high valve overlap.

The respective orifices 118, 127 and 140 are individually in series with the control jet 117 but are in parallel relationship to one another with respect to said jet. With jets in series, the drop across either jet becomes a fixed percentage of the total drop for any two given jet sizes. If we neglect manifold pressure, exhaust back pressure and volumetric efficiency, then the drop across the control jet 117 would be proportional to engine speed squared; but when this is corrected by variations in the areas of the respective orifices 118, 127 and 140 acting in parallel, the drop across the control orifice 117 becomes proportional to engine speed squared as corrected for changes in the respective variables above noted, and hence the differential across the diaphragm 31 becomes proportional to mass air flow squared.

The controlling differential across diaphragm 31 acts in a direction tending to open the poppet valve 24, which passes fuel into chamber 48 to the metering jets, and this force acts in a direction tending to close said valve until the differential across diaphragm 31 is balanced by the differential across the diaphragm 30, whereupon a condition of equilibrium is attained. Should the throttle be opened and the manifold pressure increased, the area of orifice 127 will be increased and the differential across diaphragm 31 correspondingly increased, further opening poppet valve 24, whereupon the flow of fuel and consequently the pressure in chamber 48 is increased until the differential across the diaphragm 30 balances that across the diaphragm 31.

Since the fuel head produced by control of the poppet valve 24 becomes a function of mass air flow squared, then the head across the respective metering jets will be proportional to air flow squared and the quantity of fuel flowing through each jet will be directly proportional to air flow (quantity equals area times the square root of the head).

Should manifold pressure be decreased, as by closing the throttle, the area of orifice 127 in series with 117 will be reduced, the differential across diaphragms 31 and 30 correspondingly reduced, and the available metering head will also be reduced.

Since changes in exhaust back pressure vary with changes in atmospheric pressure, the bellows 137 may be vented to the atmosphere and it will then modify the travel of needle 132 in direct relation to such changes. Preferably, the combined or compound unit is calibrated to produce constant travel of the contoured needle 132 proportional to manifold pressure minus some predetermined increment of exhaust back pressure over the entire metering range. The particular increment or fraction of the exhaust back pressure to be used is influenced primarily by the engine compression ratio.

The type of temperature compensation resulting from the arrangement of the unit including the bellows 144 and needle 143 tends to reduce fuel flow as manifold temperature increases. For enrichment at abnormally high temperatures which may exist at high power output, recourse may be had to the power enrichment valve 71 and/or an antidetonant such as water.

The speed responsive needle 121 should be contoured to correct the fuel-air ratio for departure of the engine from a given volumetric efficiency curve which may occur at certain speeds or which may occur under conditions of operation which may be predicted on speed.

Should the speed of the engine drop to a point where the control differential across the diaphragm 31 becomes so low as to produce an unreliable metering head, as at low idling speeds with the throttle nearly closed, the idle spring 36 takes over and prevents the valve 24 from fully closing. This allows sufficient fuel flow for idle purposes. During such idling speeds, the pressure in the chamber 103 of the idle valve 95 drops to a point where the differential across the diaphragm 101 permits the said valve 95 to close and effect metering of the idling fuel. At speeds above a predetermined value, the idle valve opens to a point where it offers little restriction to flow of fuel across the port or orifice 68.

Although only one embodiment of the invention has been illustrated and described, various changes in the form and relative arrangement of the parts may be made to suit requirements.

I claim:

1. In a fuel metering device for an engine, a fuel conduit having a fixed metering restriction therein, a valve movable to different flow regulating positions to adjust the metering head across said restriction, a pressure responsive element connected to said valve, means for producing hydraulically a differential across said element varying with variations in engine speed, and means responsive to changes in an engine condition indicative of mass air intake per engine revolution operative to modify said differential while the effective area of said restriction remains fixed.

2. In a fuel metering device for an engine having an air induction passage terminating in an intake manifold, a fuel conduit having a fixed metering restriction therein, a valve movable to different flow regulating positions to adjust the metering head across said restriction, a pressure responsive element connected to said valve, means for producing hydraulically a differential across said element varying with variations in engine speed, and means responsive to changes in intake manifold absolute pressure operative to modify said differential while the effective area of said restriction remains fixed.

3. A fuel metering device for an engine as claimed in claim 2 wherein there are additional means responsive to changes in manifold temperature for modifying said differential.

4. A fuel metering device for an engine as claimed in claim 2 wherein means responsive to changes in engine speed are provided for modifying said differential in a manner such as to correct the latter for departure of the engine from a predetermined volumetric efficiency curve.

5. A fuel metering device for an engine as claimed in claim 2 wherein the means for modifying said differential as a function of manifold pressure is in turn modified by means responsive to changes in a pressure indicative of exhaust back pressure.

6. In a fuel metering device for an engine having an air induction passage, a fuel conduit having a fixed metering restriction therein, a valve movable to different flow regulating positions to adjust the metering head across said restriction, a pressure responsive element such as a diaphragm connected to said valve, a restricted flow passage arrangeed across said diaphragm, an engine driven centrifugal pump adapted to circulate fuel from one side of said diaphragm to the other through said passage to create a drop across said passage and consequently a differential across said diaphragm proportional to the square of engine speed, a variable flow orifice in series with said restricted flow channel, and means responsive to changes in an engine condition indicative of mass air intake per engine revolution for varying the area of said orifice to modify the drop across said channel and consequently the differential across said diaphragm and whereby said valve is positioned in relation to the square of mass air flow to the engine and the flow through said fixed restriction is rendered proportional to air flow.

7. In a fuel metering device for an engine, a fuel conduit having a fixed metering restriction therein, a valve movable to different flow regulating positions to adjust the metering head across said restriction, a pressure responsive element such as a diaphragm connected to said valve, an engine driven pump adapted to generate a hydraulic pressure proportional to engine speed, a flow passage communicating the high pressure side of the pump with the low pressure side thereof across said diaphragm and having a control jet or restriction therein, a plurality of orifices in said flow passage arranged in parallel with one another and in series with said control jet, and means responsive to changes in a plurality of engine conditions for varying the respective areas of said orifices.

8. In a fuel metering device for an engine having an air intake passage terminating in an intake manifold, a fuel conduit having a fixed metering restriction therein, a valve movable to different flow regulating positions to adjust the metering head across said restriction, a pressure responsive element such as a diaphragm connected to said valve, an engine driven pump adapted to generate a hydraulic pressure varying with variations in engine speed, a flow passage communicating the high pressure side of the pump with the low pressure side thereof across said diaphragm and having a control jet or restriction therein, a plurality of variable orifices in said flow passage arranged in parallel with one another and individually in series with said control jet, valves for controlling said orifices, and means responsive to changes in manifold pressure modified by a pressure indicative of exhaust back pressure and engine temperature for controlling said latter valves.

9. A fuel metering device as claimed in claim 8 wherein an idle valve is provided and is controlled by a pressure responsive element in pressure communication with said pump, the arrangement being such that when the engine is at idling speed, the idle valve opens and meters idling fuel to the engine.

10. In a fuel metering device for an engine having an air intake passage terminating in an intake manifold, a fuel conduit having a plurality of branches arranged in parallel, a fixed metering restriction in each branch, a control valve downstream of said restrictions for selecting different fuel-air ratios, a head regulating valve movable to different positions to adjust the metering head across said restrictions, a pressure responsive element such as a diaphragm connected to said latter valve, an engine driven pump adapted to generate a hydraulic pressure proportional to engine speed, a flow passage communicating the high pressure side of the pump with the low pressure side thereof across the diaphragm and having a control jet or restriction therein, a plurality of orifices in said latter passage arranged in parallel with one another and individually in series with said control jet, means responsive to changes in manifold absolute temperature and pressure modified by a pressure indicative of exhaust back pressure for varying the respective areas of said orifices and whereby the differential across said diaphragm is rendered proportional to the square of mass air flow to the engine per engine revolution and the flow through said metering jets is rendered proportional to mass air flow directly.

11. A fuel metering device as claimed in claim 10 wherein said parallel orifices and valves include an orifice and associated valve for modifying the differential across said diaphragm to correct for departure of the engine from a predetermined volumetric efficiency curve, and means responsive to changes in engine speed is provided for controlling said latter valve.

12. A fuel metering device as claimed in claim 10 wherein there is provided a power enrichment valve controllable by means responsive to the fuel head across said jets, said power enrichment valve opening when the fuel head attains a predetermined value and metering additional fuel to the engine.

13. In a fuel metering device for an engine having a throttle controlled intake passage terminating in an intake manifold, a fuel conduit terminating in a pressure type discharge nozzle, a fixed metering restriction in said conduit, a valve movable to different flow regulating positions to adjust the metering head across said restriction, a pair of diaphragms connected to said valve and providing in conjunction with the adjacent walls of the diaphragms an intermediate chamber between the diaphragms and a pair of fuel chambers on opposite sides of the intermediate chamber, an engine driven centrifugal pump, a fuel flow passage communicating the intermediate chamber with the low pressure side of the pump and thence from the high pressure side of the pump across one of said diaphragms back to the intermediate chamber, a control jet or restriction in said flow passage, a plurality of orifices also in said flow passage arranged in parallel with one another and individually in series with said control jet, means responsive to changes in manifold temperature and pressure modified by a pressure indicative of exhaust back pressure for varying the respective areas of said orifices and whereby the differential across the diaphragm is rendered proportional to the square of mass air flow to the engine per engine revolution and the flow through said metering jets is rendered proportional to air flow directly, the other of said diaphragms forming a movable wall which is subjected to unmetered fuel pressure in opposition to the differential pressure across the coacting diaphragm to maintain a balanced condition at a given position of the throttle.

14. In a fuel metering device for an engine, a metering jet, a regulator valve responsive to variations in engine speed for establishing a metering head as a function of engine speed across said jet, and an idle valve responsive to changes in engine speed for metering fuel at idling speeds.

15. In a fuel metering device for an engine, a fuel conduit having a metering restriction therein, a valve movable to different flow regulating positions to adjust the metering head across said restriction, a pressure responsive element connected to said valve, means for producing a differential across said element varying with variations in engine speed, an idle jet for metering fuel to the engine at idling speeds, an idle valve controlling said idle jet, and pressure responsive means connected to said idle valve and adapted to respond to a pressure varying with variations in engine speed for positioning said idle valve as a function of engine speed in the idle range.

16. In a fuel metering device for an engine, a fuel conduit having a fixed metering restriction therein, a flow orifice in series with said fixed restriction, a valve controlling said orifice and movable to different flow regulating positions to adjust the metering head across said restriction, means responsive to variations in engine speed for controlling said regulator valve to establish a metering head as a function of engine speed across said restriction, an idle jet in series with said fixed metering restriction and orifice for metering fuel to the engine at idling speeds, means for holding said regulator valve open at predetermined low engine speeds to pass fuel to said idle jet, an idle valve controlling said jet, and means responsive to changes in engine speed controlling said idle valve.

ALBERT P. SCHNAIBLE.

REFERENCES CITED

The following references are of record in the file of this patent:

UNITED STATES PATENTS

| Number | Name | Date |
| --- | --- | --- |
| 2,426,153 | Mock | Aug. 19, 1947 |
| 2,435,902 | Reggio | Feb. 10, 1948 |
| 2,438,662 | Greenland | Mar. 30, 1948 |
| 2,438,663 | Greenland | Mar. 30, 1948 |